(12) United States Patent
Koelewyn

(10) Patent No.: US 7,922,112 B2
(45) Date of Patent: Apr. 12, 2011

(54) BAIL FOR SPINNING REEL

(75) Inventor: Robert W. Koelewyn, Stratford, CT (US)

(73) Assignee: ZeeBaas, LLC, Stratford, CT (US)

( * ) Notice: Subject to any disclaimer, the term of this patent is extended or adjusted under 35 U.S.C. 154(b) by 0 days.

(21) Appl. No.: 12/799,212

(22) Filed: Apr. 19, 2010

(65) Prior Publication Data

US 2011/0000995 A1 Jan. 6, 2011

Related U.S. Application Data

(60) Provisional application No. 61/214,248, filed on Apr. 20, 2009.

(51) Int. Cl.
*A01K 89/01* (2006.01)
(52) U.S. Cl. .................. 242/231; 242/230; 242/232
(58) Field of Classification Search .............. 242/230, 242/231, 232
See application file for complete search history.

(56) References Cited

U.S. PATENT DOCUMENTS

| 5,669,565 | A  | * | 9/1997  | Zurcher et al. ............. 242/233 |
| 5,799,889 | A  | * | 9/1998  | Plestan ..................... 242/231 |
| 6,257,513 | B1 | * | 7/2001  | Cockerham et al. ........ 242/231 |
| 2009/0250540 | A1 | * | 10/2009 | Bennis ...................... 242/233 |

* cited by examiner

*Primary Examiner* — Emmanuel M Marcelo
(74) *Attorney, Agent, or Firm* — Ware, Fressola, Van Der Sluys & Adolphson, LLP

(57) ABSTRACT

A bail assembly is provided for a spinning reel of the type having a spool mounted for reciprocal and rotational movement with respect to a body, a drag system, a rotor with a line pickup generally surrounding the spool, and a handle drive mechanism for reciprocating the spool and rotating the rotor thereabout to wind line onto the spool. The bail assembly has a bail wire formed of spring tempered stainless steel wire stock and is bent in an arc with first and second ends respectively attached to the rotor by generally diametrically opposed first and second end mounts. The arcuate bail wire exerts spring tension and the end mounts are cooperatively configured so that the bail wire is manipulable in spring toggle motion from an open position permitting line to play freely off the spool to a closed position directing line to the line pickup for collecting line on the spool. The arcuate bail wire also biases the bail assembly to remain in one of the open and closed positions until manipulated to the other position.

1 Claim, 7 Drawing Sheets

BAIL FOR SPINNING REEL

CROSS-REFERENCE TO RELATED APPLICATION

This application claims priority to my U.S. Provisional Application Ser. No. 61/214,248 filed Apr. 20, 2009 which is incorporated herein in its entirety by reference.

FIELD OF INVENTION

The invention herein relates to a bail for a spinning reel wherein the bail wire provides spring tension biasing the bail wire to an open or closed position.

BACKGROUND OF INVENTION

Spinning reels are a popular type of fishing reel, and are especially well adapted for casting lures and bait. A spinning reel generally comprises a body and a leg for mounting the spinning wheel to a fishing rod. A spool is mounted for reciprocal and rotational movement with respect to the body, and a drag system for the spool for controls the release of line. A rotor with a line pickup generally surrounds the spool, and a handle drive mechanism reciprocates the spool and rotates the rotor thereabout to wind line from the line pickup onto the spool. The spool holding the line is oriented along the rod, so that line plays off the spool freely during casting without need to rotate the spool in order to release line.

To retrieve line, or to release line by rotation of the spool against the drag system, line is positioned on a line pickup mounted to the rotor. In retrieving line, the rotor is rotated by the handle drive mechanism.

Line can be positioned on the line pickup in one of two ways. First, the line pickup can be fixed on the rotor generally over the spool, and the fisherman then uses a finger to place the line on the line pickup.

Line may also be positioned on the line pickup by a bail assembly. The bail assembly generally includes a bail wire that extends across the rotor and pivots between an open position and a closed position. In the open position, the bail does not interfere with line playing off the spool during casting. In the closed position, the bail wire catches the line and directs it onto the line pickup.

A requirement of a bail assembly is that there must be a force that keeps it firmly in the closed position or firmly in the open position. It must remain open during casting, so that line plays freely off the spool. It must remain closed during line retrieval or line play off against the drag system, so that the line is controlled as desired. In presently know bail assemblies, this force is provided by one or more coil springs acting on the bail wire through connecting members. The coil spring and its connecting members are generally positioned in a pocket or housing positioned on the rotor, which creates a relatively bulky structure. The springs are prone to failure, from rust, saltwater corrosion or simply breakage, and often have insufficient force to prevent the bail from closing as a result of casting motion.

Therefore, an improvement in bail mechanisms would be a welcome advance in the art.

SUMMARY OF THE INVENTION

It is a principal object of the invention herein to provide an improved bail assembly for spinning reels.

It is an additional object of the invention herein to provide a bail for a spinning reel with high reliability.

It is also an object of the invention herein to provide a bail with simplicity of construction and light weight, in part achieved through a minimum of moving parts.

It is a further object of the invention herein to provide a bail that smoothly guides line onto a line pickup of the spinning reel.

In carrying out the invention herein, a bail assembly is provided for a spinning reel of the type having a body and leg, a spool mounted for reciprocal and rotational movement with respect to the body, a drag system for the spool, a rotor with a line pickup generally surrounding the spool, and a handle drive mechanism for reciprocating the spool and rotating the rotor thereabout to wind line from the line pickup onto the spool. The bail assembly for use with the spinning reel has an arcuate bail wire formed of spring tempered steel wire stock, the arcuate bail wire having first and second ends respectively pivotally attached to the rotor at generally diametrically opposed first and second end mounts. The bail wire is formed in an arc that creates spring tension, and the end mounts are configured such that the bail wire is manipulable in spring toggle motion utilizing the spring tension of the bail wire, from an open position permitting line to play off freely from the spool to a closed position directing line to the line pickup for collecting line on the spool.

In certain aspects of the invention, the end mounts are positioned and configured such that the bail wire spring tension toggles the bail wire at the approximate mid-point of movement between the open and closed bail positions, wherein as the bail wire moves from the mid-point, the spring tension biases the bail wire to the closest one of the open and closed bail positions. Stops are provided to establish the opened and closed positions.

In another aspect of the invention, the first end of the bail wire is attached to a first end mount at a fixed position on the rotor and the second end of the bail wire is attached to a bail arm, the bail arm being pivotally mounted to the rotor for pivoting movement about a bail arm pivot axis, the fixed position of the first end mount being offset from the bail arm pivot axis. The first end mount is offset below the bail arm pivot axis, such that the bail wire exerts increased spring tension on the mid-point of the transition between the open and closed bail wire positions, thereby causing the toggle motion.

In an additional aspect of the inventions, both end mounts accommodate and control positions of the bail wire that cause toggle motion as the bail wire is moved between its open and closed positions.

Other aspects of the invention include low friction end mounts for the ends of the arcuate bail wire. A fixed low friction end mount is a hard polymer ball secured to the end of the bail wire and received and retained in a socket in the rotor. For an end mount including an arm, the arm is mounted to the rotor on low friction bearings, such as ball bearings.

In another aspect of the invention, one of the end mounts includes a bail arm and the line pickup of the rotor is mounted on the bail arm. An end of the bail wire is attached to the bail arm by a guide that directs line from the bail wire to the line pickup. The guide may have a generally conical shape.

The foregoing and other objects and features of the invention herein will in part appear in the following detailed description of the invention and the claims, taken together with the drawings.

BRIEF DESCRIPTION OF DRAWINGS

The same reference numerals refer to the same elements throughout the various Figures.

DETAILED DESCRIPTION

Figure 1:
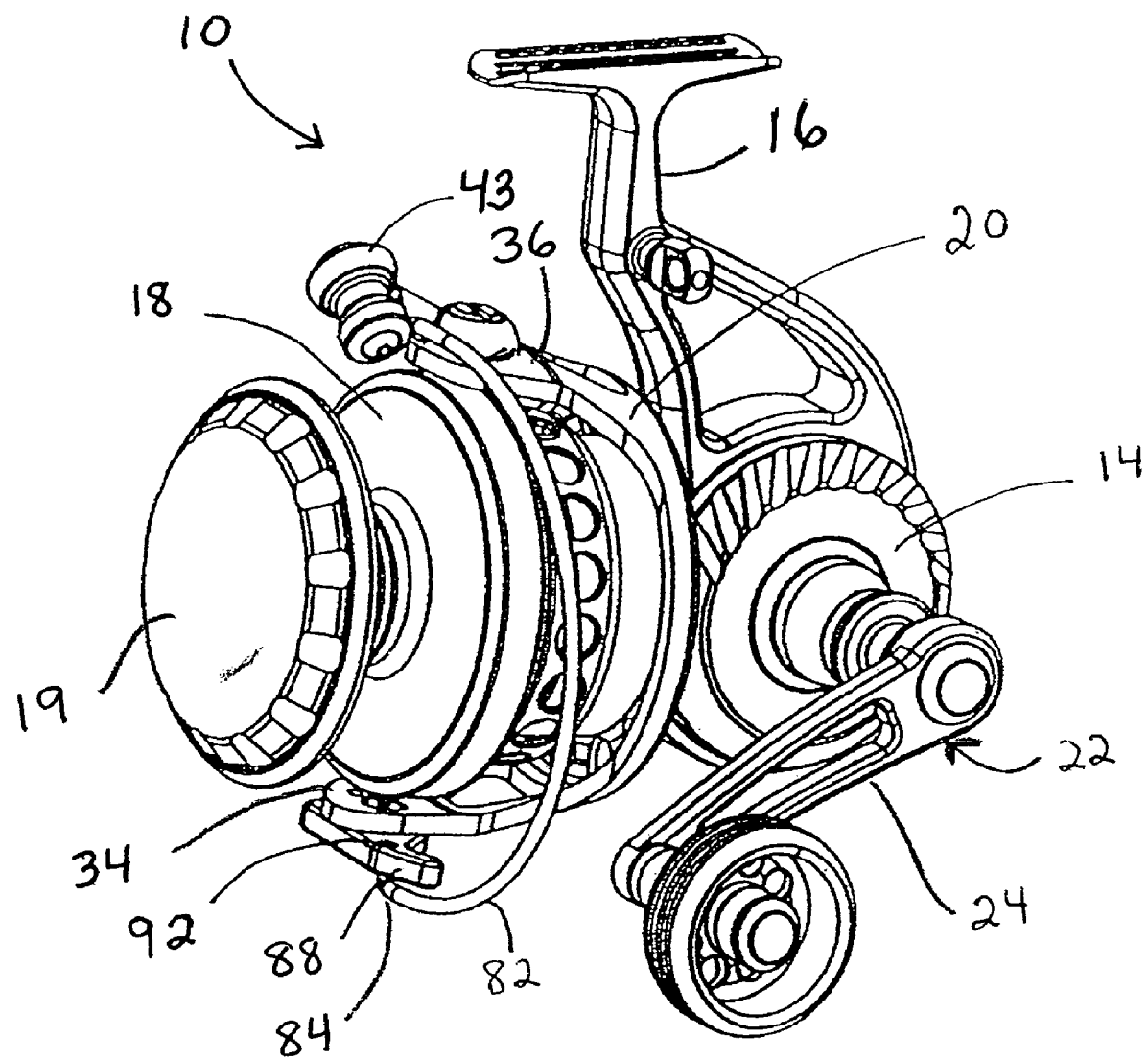
FIG. 1 is a perspective view of a spinning reel according to the invention herein, having a bail assembly thereon.
Figure 2:
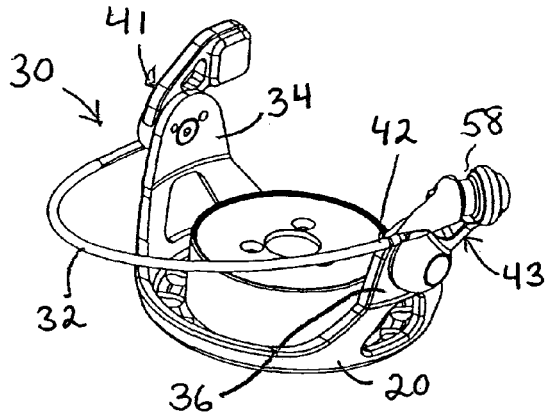
FIG. 2 is a perspective view of a rotor for the spinning reel of FIG. 1 with another bail assembly according to the invention herein, in its closed position.
Figure 5:
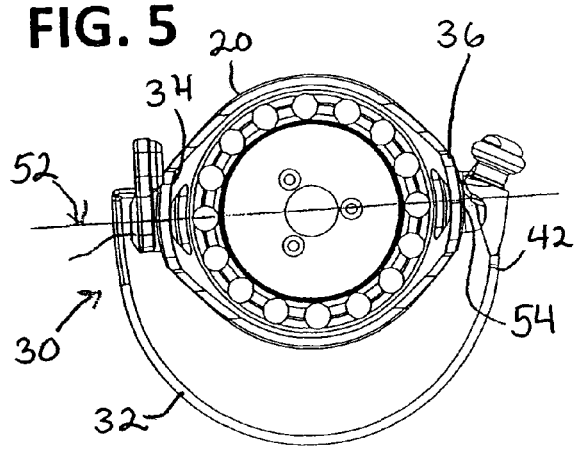
FIG. 5 is an end view of the rotor and bail arm assembly of FIG. 2 in the closed position.
Figure 3:
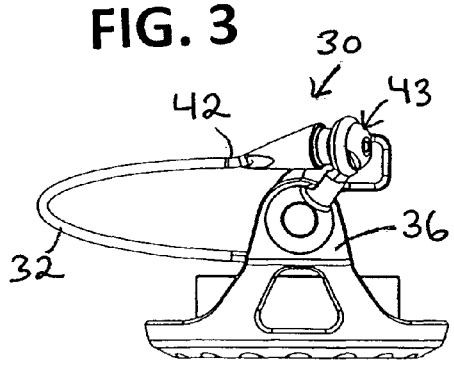
FIG. 3 is a side view, taken from the line pickup side, of the rotor and bail assembly of FIG. 2, in the closed position.
Figure 6:
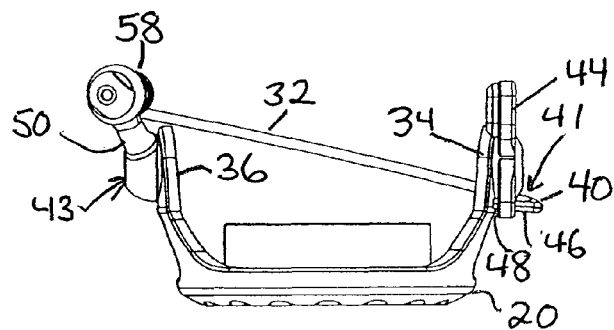
FIG. 6 is a rear view of the rotor and bail arm assembly of FIG. 2 in the closed position.
Figure 4:
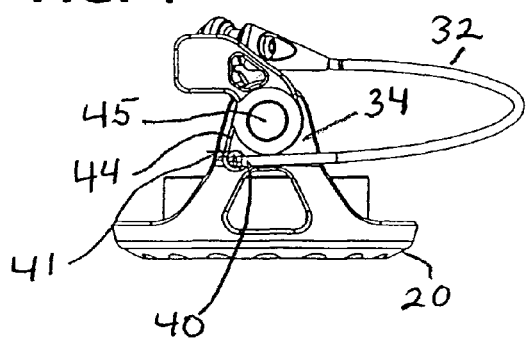
FIG. 4 is a side view, taken from the counterweight side, of the rotor and bail arm assembly of FIG. 2 in the closed position.
Figure 7:
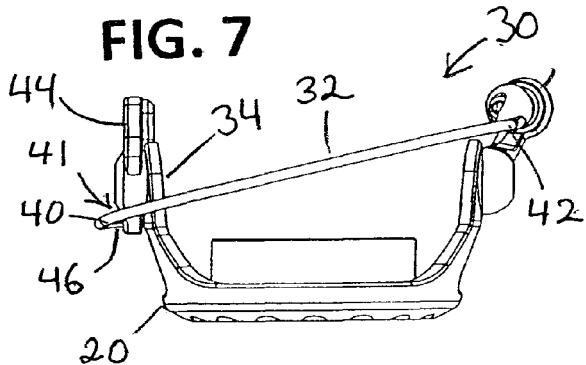
FIG. 7 is a front view of the rotor and bail arm assembly of FIG. 2 in the closed position.
Figure 8:
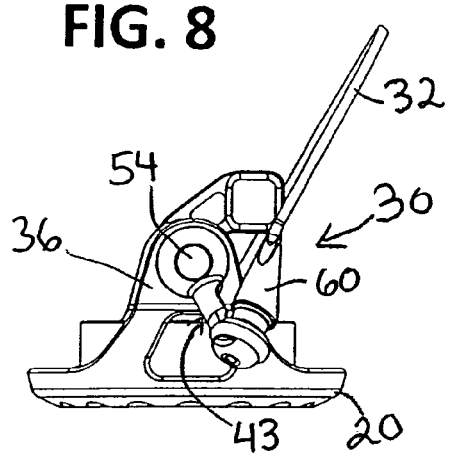
FIG. 8 is a side view, taken from the bail arm side, of the rotor and bail arm assembly of FIG. 2 in the open position.
Figure 9:
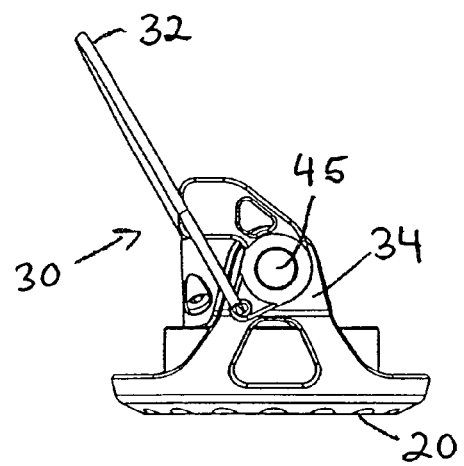
FIG. 9 is a side view, taken from the counterweight side, of the rotor and bail arm assembly of FIG. 2 in the open position.
Figure 10:
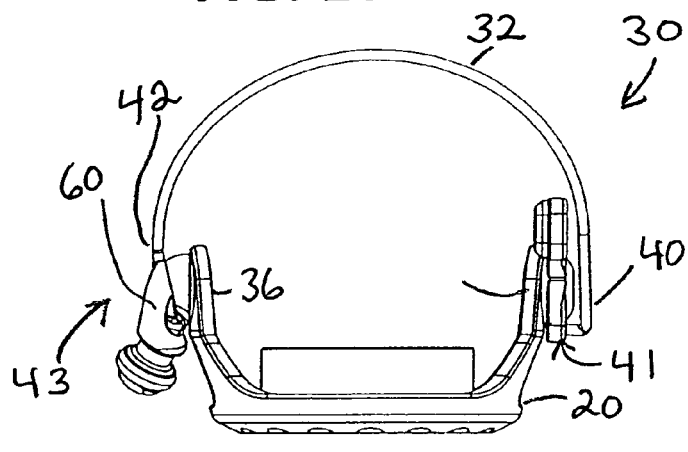
FIG. 10 is a front view of the rotor and bail arm assembly of FIG. 2, in the open position.
Figure 11:
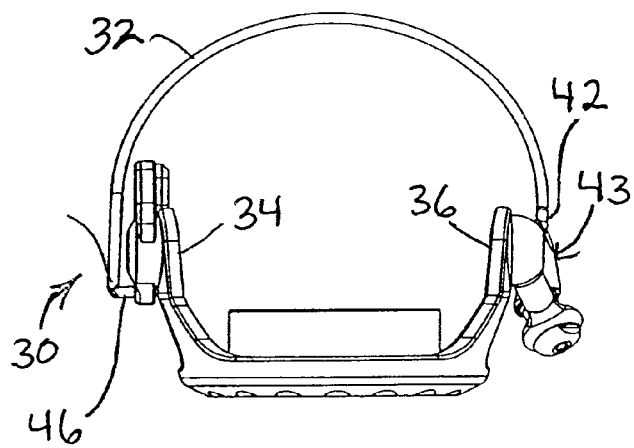
FIG. 11 is a rear view of the rotor and bail arm assembly of FIG. 2, in the open position.

With reference to FIG. 1, a spinning reel 10 having a bail assembly 12 according to the invention herein is illustrated. The spinning reel 10 generally comprises a body 14 having a mounting leg 16 extending therefrom, a spool 18 mounted for reciprocal and rotational movement with respect to the body 14 and a drag system 19 for the spool. A rotor 20 generally surrounds the spool 18, and a handle drive mechanism 22 including a handle 24 and internal gearing, not shown but well known in the art, reciprocates the spool and rotates the rotor 20 thereabout to wind line onto the spool. The bail assembly 12 is mounted to the rotor 20.

Several bail assemblies are described herein, and a second bail assembly 30 is illustrated in FIGS. 2-13. The bail assembly 30 is characterized by a bail wire 32, which is formed of spring tempered stainless steel wire stock. The bail wire 32 is bent into an arc, which develops spring tension and provides the energy to assist in toggling the bail wire from the closed position shown in FIGS. 2-7 to the open position in FIGS. 8-11 and for retaining the bail wire 32 in the appropriate position once it is moved to one of the open and closed positions.

The rotor 20 has opposed extending walls 34 and 36 which generally surround the spool 18 in the reel 10. The bail assembly 30 is mounted to the rotor 20 on the walls 34, 36. The bail wire 32 is arcuate, and has a first end 40 and a second end 42. The first end 40 is mounted to the rotor wall 34 at end mount 41, which in the embodiment shown includes a counterweight arm 44, which is in turn mounted to the rotor wall 34 by a screw 45. The first end 40 of the bail wire 32 has a stub axle 46 which extends into the counterweight arm 44, wherein the pivot point of the first end 40 of the bail wire 12 is offset from the screw 44. It is important that the bail assembly 12 pivot freely, and therefore the stub axle 46 is received in a polymer bearing 48, shown in FIG. 12, and received in a mating socket in the counterweight arm 44.

The second end 42 of the bail wire 32 is mounted to rotor wall 36 by bail arm 50. The bail arm 50 is rotatably mounted to the rotor wall 36 about axis 52, seen in FIG. 5, being secured by a screw 54. The screw 54 is diametrically opposed from the screw 45 mounting the counterweight arm 44, and the axis 52 passes through both screws 45 and 54. Thus it can be seen that the mounting point of the first end 40 of the bail wire 32 is offset from the axis of rotation of the bail arm 50. The second end 42 of the bail wire 32 is mounted to the outer end of the bail arm 50 by a conical guide member 60. The second end 42 of the bail wire 32 extends into the conical guide member 60, and the guide member 60 is secured to the bail arm 50. A line pickup 58 is also mounted at the end of the bail arm 50, and the conical guide member 60 guides line captured by the bail wire 32 onto the line pickup 58 when the bail assembly 12 is closed. The line pickup 58 is preferably a line roller with bearings, for low friction.

Before the bail wire 32 is attached to the bail arm and counterweight, the first and second ends 40, 42 are closer together. In other words, in untensioned condition, the bail wire 32 would define an arc of a smaller radius than when it is installed, and the bail wire 32 is therefore tensioned when installed to provide a force between the ends 40 and 42. If the ends 40, 42 are further spread apart during operation of the bail assembly 12, the tension and force increase. As the bail wire 32 is transitioned from the closed position shown in FIGS. 2-5 to the open position shown in FIGS. 8-11, the bail arm 50 rotates about its rotational axis 52. The configuration of the end mounts 41, 43 of the bail wire 32, including the bail arm 50, cause the first and second ends 40, 42 of the bail wire 32 to separate during the transition with the greatest point of separation occurring at or near the mid-point of the transition from open to closed position. This creates a toggle function, such that when the bail is incrementally directed toward either of the open or closed positions, the spring force drives the bail wire to that position and maintains it there.

Figure 12:
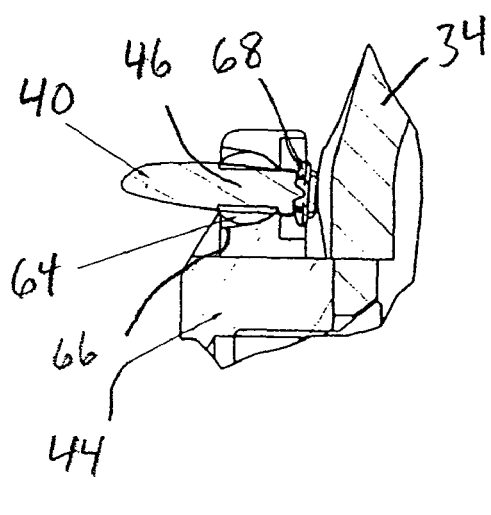
FIG. 12 is a fragmentary sectional view showing one end of the bail wire mounting to the rotor.

It is important that the end mounts 41, 43 of the bail wire 32 rotate with minimal friction. With reference to FIG. 12, end mount 41 is shown. The first end 40 of bail wire 32 has a stub axle 46 received in a polymer ball 64. The polymer ball 64 is received in socket 66 in the counterweight arm 44, where it rotates with minimal friction. A clip 68 secures the stub axle, polymer ball and bail wire 32.

The bail wire 32 is offset at the position established by the polymer ball pivot point such that the toggle point favors the closed direction. This will make it more difficult to close the bail and easier to open the bail. It is preferred that the bail is more difficult to close because the force from the casting out can prematurely close the bail. This bail design helps prevent this problem by the two directional offset position of the bail wire 32 at the polymer ball pivot point.

Figure 13:
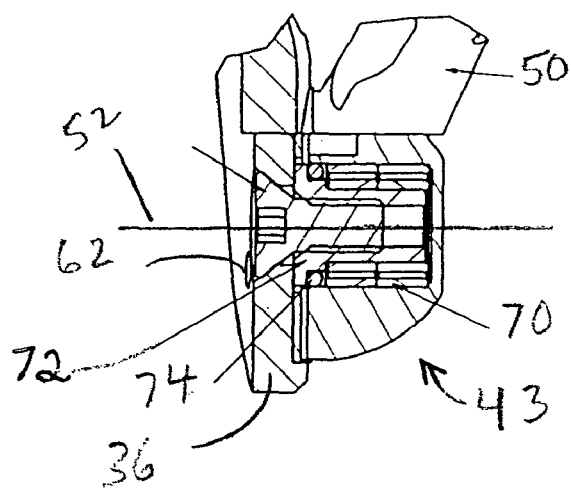
FIG. 13 is a fragmentary sectional view showing one end of the bail wire mounting to the rotor.
Figure 14:
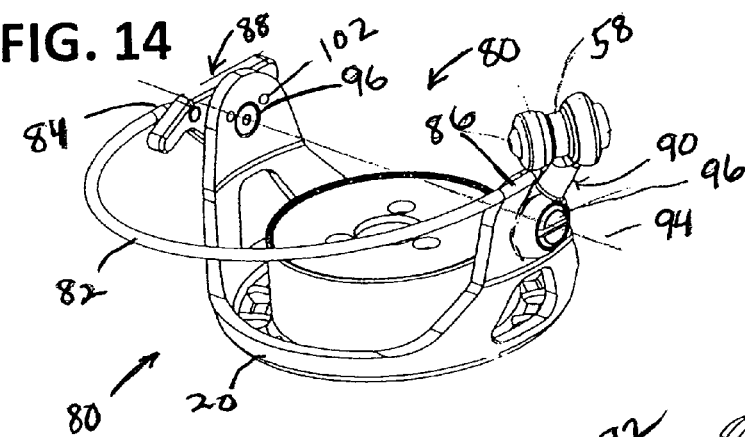
FIG. 14 is a perspective view of the rotor and bail arm assembly of FIG. 1 in the closed position.
Figure 16:
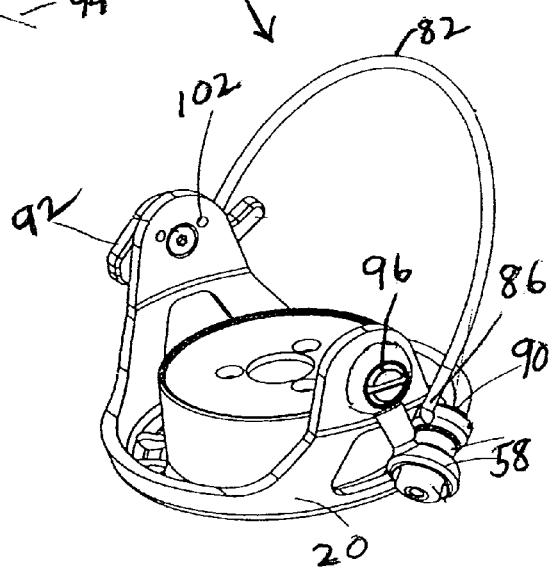
FIG. 16 is a perspective view of the rotor and bail arm assembly of FIG. 1 in the open position.
Figure 15:
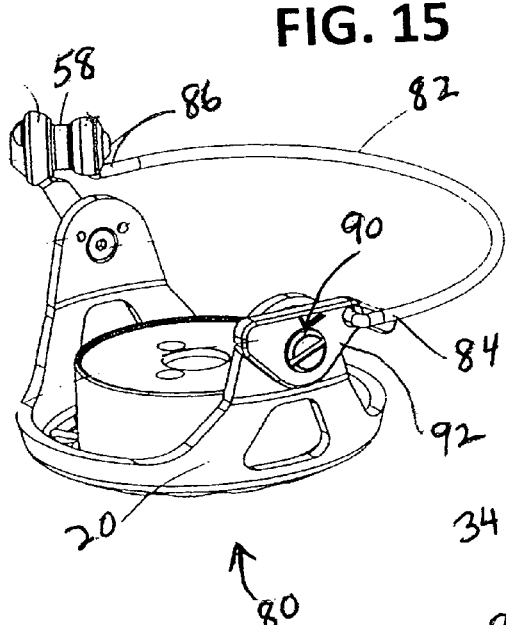
FIG. 15 is another perspective view of the rotor and bail arm assembly of FIG. 1 in the closed position.
Figure 17:
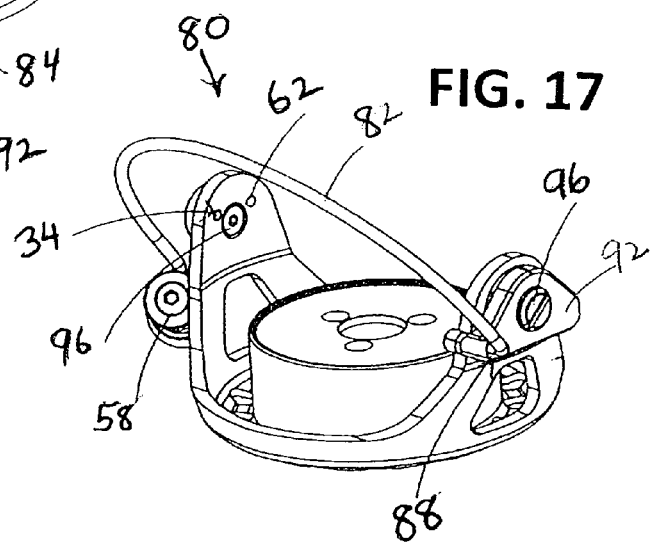
FIG. 17 is another perspective view of the rotor and bail arm assembly of FIG. 1 in the open position.
Figure 18:
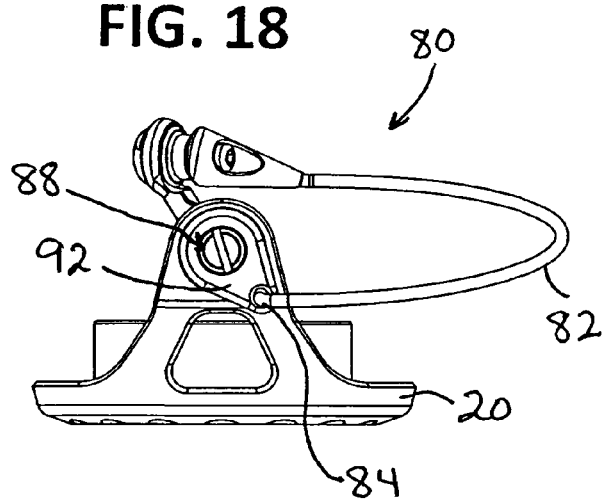
FIG. 18 is a side elevation diagramatic view, from the counterweight side, of the rotor and bail assembly of FIG. 1 in the closed position.

With reference to FIG. 13, the bail arm 50 of end mount 43 is mounted to the rotor wall 36 by bearings 70 on bearing post 72. An O-seal 74 is also provided. Ball bearings, roller bearings or other low friction mounting may be used.

The open and closed positions of the bail assembly 12 are established by a pin 62 extending from rotor wall 36 adjacent the axis of rotation 52 of the bail arm 50, and the bail arm 50 has an arcuate slot in which the pin 62 travels. The pin 62 engages against one end of the slot to establish the open position of the bail assembly 12, and against the other end of the slot to establish the closed position of the bail.

In actual operation of the spinning reel 10 and bail assembly 12, the fisherman will grasp the bail wire 32 and move it from its present position, which may be open or closed, to its other position. As the bail wire 32 crosses the center point, i.e., the point at which the compressive force of the spring is greatest, the bail wire 32 exhibits its toggle function and will continue its transition to the desired position without further input from the user.

With reference to FIGS. 14-22, bail assembly 80 according to the invention herein is illustrated. It is also the bail assembly shown on reel 10 in FIG. 1. In bail assembly 80, a bail wire 82 has first end 84 and second end 86, which are respectively secured to first and second end mounts 88 and 90. The first end mount 88 is a rotatable lever arm 92, with an axis of rotation 94 extending through its mounting screw 96. The axis of rotation 94 also extends through end mount 90. The first end 84 of the bail wire 82 is rotatably mounted to the lever arm 92, offset from the axis of rotation of the lever arm 92.

The second end mount 90 is a bail arm 100, having its first end rotatably mounted to rotor wall 36 on the same axis of rotation 92 of the lever arm 92. The second end 86 of the bail wire 82 is secured to the distal end of the bail arm 100, such that the bail wire 82 feeds line onto the line pickup 58 at the end of the bail arm.

The bail wire 82 is also spring tempered stainless steel stock bent to an arcuate shape and has a larger diameter when free of the end mounts 88, 90 than when it is secured to the end mounts. Therefore, the mounted bail wire 82 is under tension that tends to pull on the lever arm 92.

Figure 19:
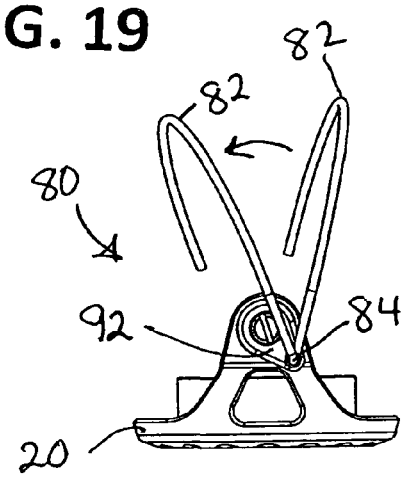
FIG. 19 is a side elevation diagramatic view, from the counterweight side, of the rotor and bail assembly of FIG. 1 with the bail assembly in transition from the closed position toward the open position.
Figure 20:
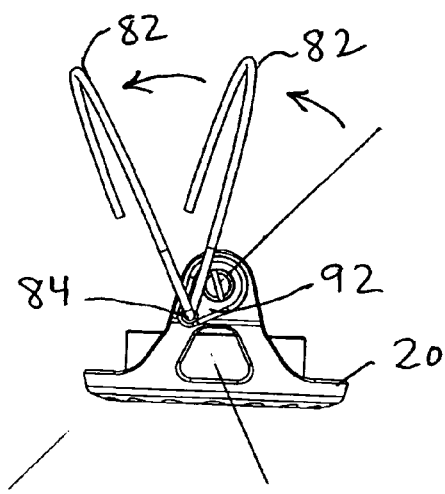
FIG. 20 is a side elevation diagramatic view, from the counterweight side, of the rotor and bail assembly of FIG. 1 in transition from the closed position toward the open position.
Figure 21:
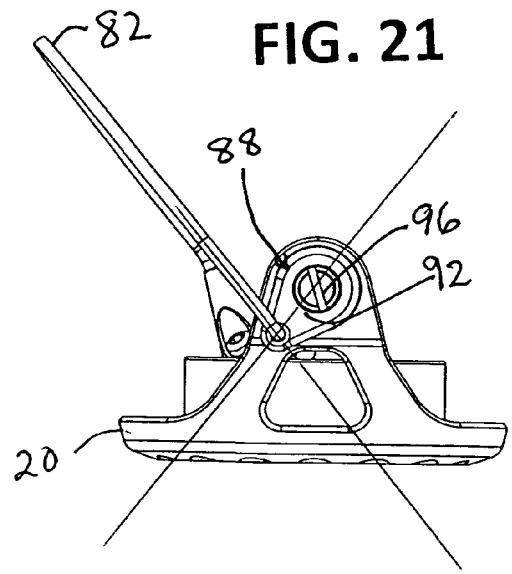
FIG. 21 is a side elevation diagramatic view, from the counterweight side, of the rotor and bail assembly of FIG. 1 in the open position.

The lever arm 92 has an arcuate slot therein which cooperates with a pin 102 extending from the rotor wall 34 to establish open and closed positions of end mount 88 of the bail assembly 80. In the closed position shown in FIGS. 14, 15 and 18, the bail wire pulls on the lever 92, maintaining it against the pin 102 in the closed bail condition. As shown in FIG. 19, as the bail assembly 80 is moved from the closed position toward the opened position, the configuration of the end mounts 88, 90 increases the spring tension in the bail wire 82, and as the bail wire 82 reaches the center point, the lever arm 92 begins to rotate. The rotation is shown continuing in FIG. 20, after the bail wire 82 has passed over center, and is complete in FIG. 21, where the bail assembly 80 is shown in its open position. When the bail is returned to its closed position, the sequence of motion illustrated in FIGS. 18-21 is reversed. Therefore, the toggle function of the bail assembly 80 is expressed in the toggle action of the lever arm 92. This is another example of an end mount configuration that utilizes spring tension of the bail wire to toggle the bail assembly between its open and closed positions.

FIGS. 22-25 illustrate another bail assembly 110, which may be used with the spinning reel 10 of FIG. 1. The bail assembly 110 is mounted to a rotor 20a having rotor walls 34a and 36 at end mounts 112 and 114. End mount 114 includes a bail arm 100 and line pickup 58 as described above with respect to bail assembly 80 is wall 36 and receives end 118 of bail wire 120. The second end 116 of the bail wire 120 is received in a slot 122 in the rotor wall 34a, which functions as the end mount 112. The slot 122 is elongated, and has stop indents 126 and 128 at its opposite ends.

The second end 118 of the bail wire 120 that is received in the slot 122 is fitted with a small roller bearing or the like, to reduce friction in the slot 122 as the end 118 of the bail wire 120 moves in the slot 122 between indents 126, 128.

Figure 22:
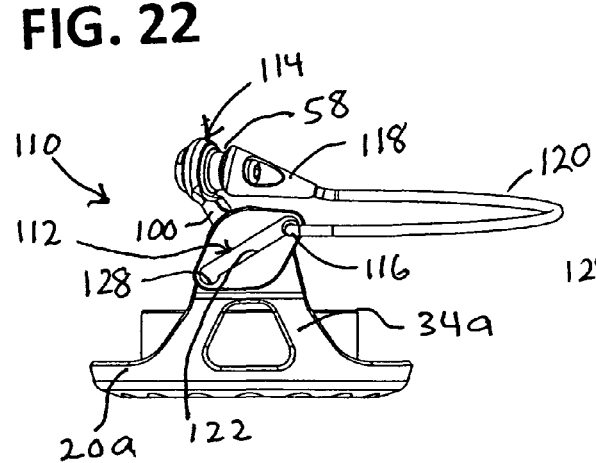
FIG. 22 is a side elevation view of another rotor and bail arm assembly, taken from the opposite side of the bail arm, in the closed position.
Figure 23:
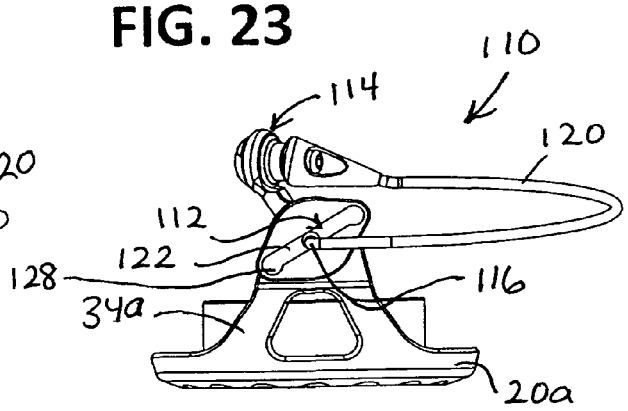
FIG. 23 is a side elevation view of the rotor and bail arm assembly of FIG. 22, transitioning from the closed position toward the open position.
Figure 24:
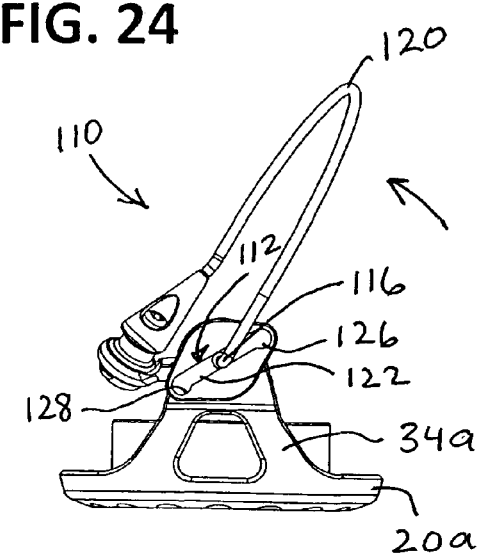
FIG. 24 is a side elevation view of the rotor and bail arm assembly of FIG. 22, transitioning from the closed position toward the open position.
Figure 25:
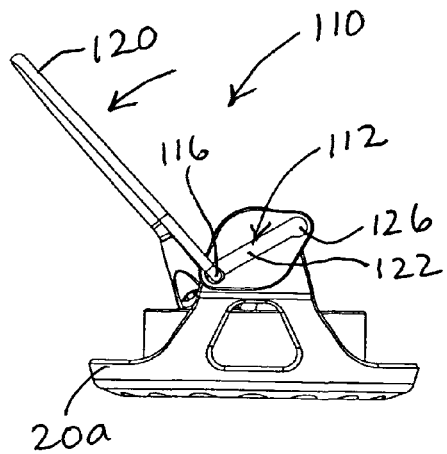
FIG. 25 is a side elevation view of the rotor and bail arm assembly of FIG. 22, in the open position.

FIGS. 22-25 illustrate the progression of the bail assembly 110 when moved from its closed position in FIG. 22 to its open position shown in FIG. 25. In the closed position shown in FIG. 22, the end 116 of the bail wire 110 is in detent 126 of the slot 120. The bail assembly 110 is manipulated to its open position by lifting the bail wire 120. As shown in FIG. 23, as the bail wire 110 is initially pushed and lifted toward the open position, end 116 of the bail wire 120 moves from detent 128 toward detent 126. As the bail wire 120 goes over center, which is the position generally shown in FIG. 24, the bail assembly 110 toggles to the open position shown in FIG. 25 with the end 116 of the bail wire 120 at the second detent 128 of the slot 122. Again, moving the bail assembly 110 from the open to the closed position is achieved by reverse manipulation. The slot 122 provides an end mount 112 for the tensioned bail wire 120 in a configuration that achieves toggle action of the bail assembly 110 from its closed to open position and from its open to its closed.

Accordingly, bail assemblies for spinning reels have been described which admirably achieve the objects of the invention herein. It will be appreciated by those skilled in the art that the foregoing embodiments are illustrative only, and that various changes may be made without departing from the spirit and scope of the invention.

I claim:

1. A bail assembly for a spinning reel of the type having a body and leg, a spool mounted for reciprocal and rotational movement with respect to the body, a drag system for the spool, a rotor with a line pickup generally surrounding the spool, and a handle drive mechanism for reciprocating the spool and rotating the rotor thereabout to wind line from the line pickup onto the spool, the bail assembly comprising:
    A. a bail wire formed of spring tempered stainless steel wire stock;
    B. the bail wire bent in an arc and having first and second ends respectively attached to the rotor by generally diametrically opposed first and second end mounts with the arcuate bail wire exerting spring tension; and
    C. the end mounts configured so that the bail wire is manipulable in spring toggle motion from an opened position permitting line to play freely off the spool to a closed position directing line to the line pickup for collecting line on the spool, and wherein the arcuate bail wire biases the bail assembly to remain in one of the open and closed positions until manipulated to the other of the open and closed positions.

* * * * *